United States Patent
Liu et al.

(10) Patent No.: US 10,939,526 B2
(45) Date of Patent: Mar. 2, 2021

(54) RELIABILITY OF HARDWARE RESET PROCESS FOR SMART LIGHT EMITTING DIODE (LED) BULBS

(71) Applicants: Yuhao Liu, Medford, MA (US); Nilesh Patel, East Windsor, NJ (US); Ming Li, Acton, MA (US)

(72) Inventors: Yuhao Liu, Medford, MA (US); Nilesh Patel, East Windsor, NJ (US); Ming Li, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 16/862,758

(22) Filed: Apr. 30, 2020

(65) Prior Publication Data
US 2020/0351998 A1    Nov. 5, 2020

Related U.S. Application Data

(63) Continuation of application No. 16/398,371, filed on Apr. 30, 2019, now Pat. No. 10,674,585.

(51) Int. Cl.
*H05B 45/37* (2020.01)

(52) U.S. Cl.
CPC ............................... *H05B 45/37* (2020.01)

(58) Field of Classification Search
CPC ........ H05B 45/37; H05B 45/395; Y02B 20/30
See application file for complete search history.

(56) References Cited

U.S. PATENT DOCUMENTS

| 10,674,585 B1* | 6/2020 | Liu ...................... H05B 45/395 |
| 2012/0212144 A1* | 8/2012 | Hayashi ................. H05B 45/50 315/193 |
| 2012/0299512 A1* | 11/2012 | Watanabe .............. H05B 45/10 315/307 |

* cited by examiner

*Primary Examiner* — Daniel D Chang
(74) *Attorney, Agent, or Firm* — Tutunjian & Bitetto PC

(57) ABSTRACT

A driver circuit for lighting applications that includes a power input circuit for receiving power; a light emitting diode (LED) output current circuit for interfacing with a light source; and a light emitting diode (LED) power supply circuit for controlling current to the light emitting diode (LED) output current circuit. A controller circuit is present in the circuit for signaling the light emitting power supply (LED) to control current to the light emitting diode (LED) output current circuit. The controller is reset by removing power to the controller. A smoothing capacitor is present for stabilizing at least an output voltage. The circuit further includes a current rectifying circuit that prohibits back current traveling from the smoothing capacitor to the controller circuit when the AC power is off.

20 Claims, 5 Drawing Sheets

RELIABILITY OF HARDWARE RESET PROCESS FOR SMART LIGHT EMITTING DIODE (LED) BULBS

CROSS-REFERENCE TO RELATED APPLICATION

This patent application is a Continuation and claims benefit and priority to U.S. patent application Ser. No. 16/398,371, titled "DESIGN TO IMPROVE RELIABILITY OF HARDWARE RESET PROCESS FOR SMART LIGHT EMITTING DIODE (LED) BULBS" filed on Apr. 30, 2019, which is herein incorporated by reference in its entirety

TECHNICAL FIELD

The present disclosure generally relates to methods and structures that reduce the turn off time during resetting a controller that is used to control a light emitting device. The present disclosure also relates to methods and structures that improve the reliability of the reset process for controllers used in lighting.

BACKGROUND

Improvements in lighting technology often rely on finite light sources (e.g., light-emitting diode (LED) devices) to generate light. In many applications, LED devices offer superior performance to conventional light sources (e.g., incandescent and halogen lamps). Further, light bulbs have become smarter in recent years. People can now replace standard incandescent bulbs with smart bulbs that can be controlled wirelessly using smart phones or tablets. However, problems have been recorded for resetting smart bulbs including LED light sources. Similar to a computer or a smart phone, the smart LED bulbs have a controller, and it may malfunction. But different from a computer or a smart phone, in which users can access buttons and controls to reset the controller of a computer or smart phone, with smart LED bulbs such means for resetting a controller of a smart LED are not available. Smart LED bulbs are installed in the ceiling and within enclosures that obstruct access to physical controls on the smart LED bulb. Hence smart LEDs can not implement mechanical reset buttons or switches.

SUMMARY

In one embodiment, the methods and structures of the present disclosure improve reset functions for controller circuits, such as microcontroller including circuits, that are used in smart lamps, such as light emitting diode (LED) smart lamps.

In one aspect, a driver circuit for lighting applications is provided that includes a reset timing circuit that improves the reset functions for controller circuits that are used in smart bulbs, such as light emitting diode (LED) smart bulbs. In one example, the driver circuit includes a power input circuit for receiving power, a light emitting diode (LED) output current circuit for interfacing with a light engine, and a light emitting diode (LED) power supply circuit for controlling current from the power input circuit to the light emitting diode (LED) output current circuit. The driver circuit further includes a controller circuit including a controller for signaling the light emitting diode (LED) power supply to control current to the light emitting diode (LED) output current circuit to provide for lighting characteristics that are adjustable. The controller is reset by a sequence of removing power to the controller. An smoothing capacitor is present in the circuit for stabilizing at least an output voltage. The circuit further includes a current rectifying circuit that allows forward current to travel from the power input circuit to the light emitting diode (LED) power supply circuit. The current rectifying circuit also prohibits back current from the smoothing capacitor from traveling to the controller circuit when the power is turned off. By prohibiting the back current from the input capacitor from reaching the controller circuit, the current rectifying circuit eliminates residual power from powering the controller circuit once the power is turned off. Keeping the residual power in the circuit from powering the controller circuit allows for more consistent resetting and/or reprogramming of the controller when the reset function for the controller includes toggling the power that powers the lamp from ON to OFF. In one example, the smoothing capacitor is an input capacitor that is present in the circuit for stabilizing an input voltage circuit, and is positioned between the AC power input circuit and the light emitting diode (LED) power supply circuit. In another example, the smoothing capacitor is an output capacitor.

In another aspect, a lamp is provided that includes a microcontroller for adjusting the characteristics of light being emitted by the lamp. The microcontroller also includes a reset timing circuit that improves the reset functions for the microcontroller to reset the light adjustment settings being controlled through the microcontroller. In one embodiment, the lamp includes a light engine including light emitting diodes (LEDs) for providing light, and a driver package. The driver package of the lamp can include an power input circuit, a light emitting diode (LED) output circuit in connection with the light engine, and a controller circuit for adjusting current to the light emitting diode (LED) output current circuit. The driver package can also include a current rectifying circuit that allows forward current to travel from the power input circuit to the light emitting diode (LED) power supply circuit, and substantially prohibits back current from traveling to the controller circuit when the power is off. In some embodiments, the controller circuit includes a microcontroller that is reset by switching the power source ON and OFF without the microcontroller being powered by residual power produced by the back current that is blocked by the current rectifying circuit.

In another aspect, a method is provided for the reset functions for a microcontroller used to control the light adjustment settings in a lamp, e.g., smart lamp, such as a light emitting diode (LED) smart lamp. In one embodiment, the method for resetting a controller of a lighting device includes positioning a microcontroller in a driver package for powering a light engine of a lamp, in which the driver package includes a smoothing capacitor and a linear current regulator to the light engine. The instructions of the microcontroller for adjusting light emitted by the light engine are reset by toggling the AC power source ON and OFF. The method further includes positioning a rectifying current circuit between the smoothing capacitor and the microcontroller. The rectifying current circuit allows forward current to travel from the AC power source through the linear current regulator to power the light engine when the AC power is ON. The rectifying current circuit obstructs back current from the smoothing capacitor to the microcontroller when the AC power source is OFF. The method further includes resetting the microcontroller by said toggling the AC power source ON and OFF, wherein the back current from the light engine is obstructed by the rectifying current circuit from powering the microcontroller during said resetting of the microcontroller.

In one embodiment, the driver package includes a power input circuit for interfacing with an AC power source. The AC power input circuit includes a rectifying bridge for converting AC current into DC current. The current rectifying circuit includes a diode positioned between the rectifying bridge and the input capacitor. In some embodiments, the driver package may include a residual capacitor for storing any residual power in the circuit. In one example, the smoothing capacitor is an input capacitor that is present in the circuit for stabilizing an input voltage circuit, and is positioned between the AC power input circuit and the light emitting diode (LED) power supply circuit. The residual capacitor has a lower capacitor than the smoothing capacitor. In another example, the smoothing capacitor is an output capacitor.

BRIEF DESCRIPTION OF THE DRAWINGS

The following description will provide details of embodiments with reference to the following figures wherein.

DETAILED DESCRIPTION

Figure 1:
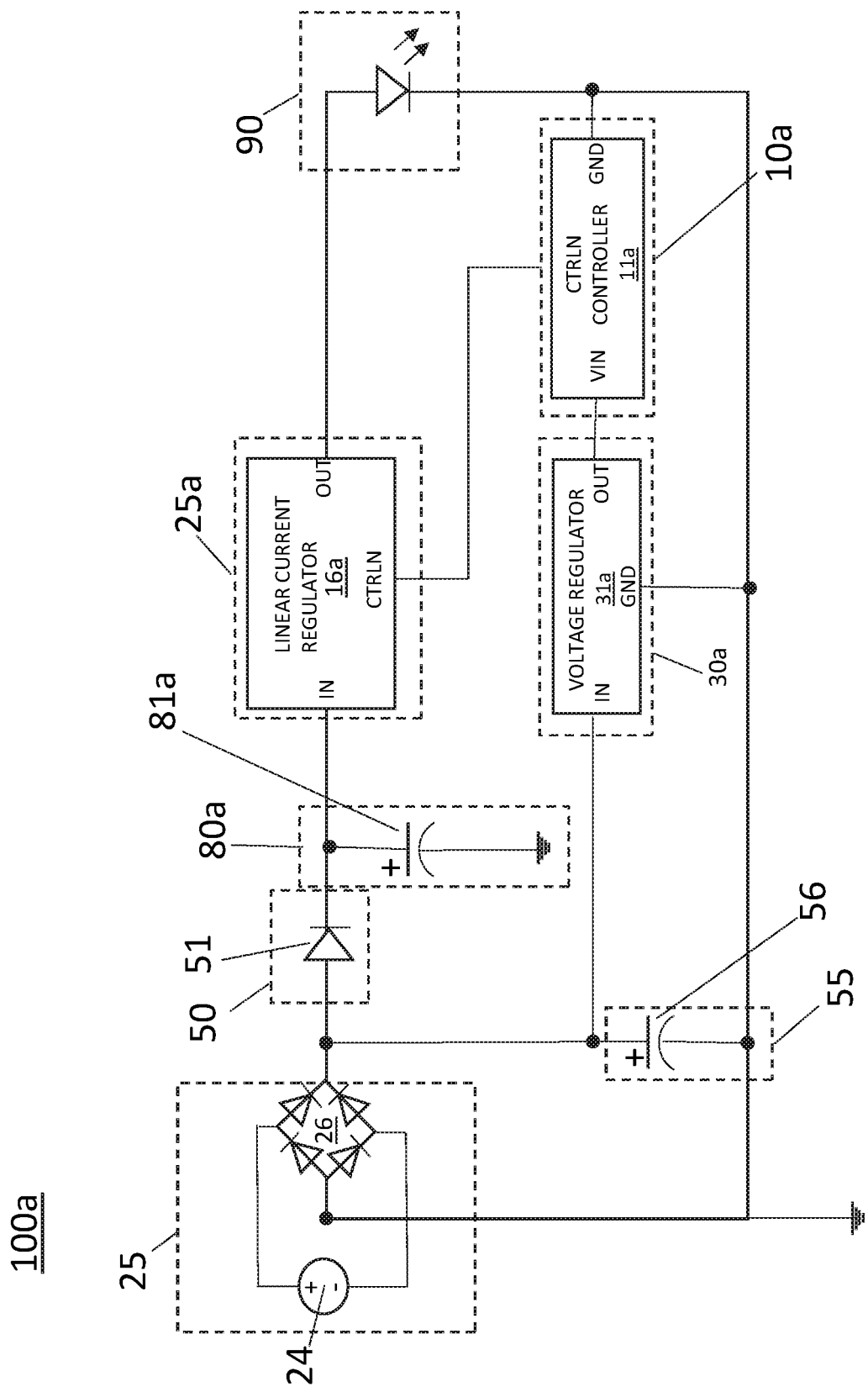
FIG. 1 is a circuit diagram of a reset timing circuit for a light emitting diode (LED) smart bulb including a microcontroller, in which a diode is positioned within the circuit to allow forward current and to block backward current, wherein by blocking backward current when the power is removed from the circuit, the diode prohibits residue energy from being stored in the circuit from powering the controller during reset operations, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the methods and structures described herein are related to providing ways to reset the controller of a smart bulb, such as a smart bulb that includes a light engine of light emitting diodes (LEDs). As used herein, the term "smart bulb" or "smart LED bulb" denotes a lighting device, such as a light bulb or lamp, having a microcontroller as one of the components of the device, in which the microcontroller effectuates at least one set of instructions for controlling at least one characteristic of light being emitted from the device. A microcontroller may be an integrated circuit (IC) designed to govern a specific operation in an embedded system. In some embodiments, the microcontroller includes a processor, memory and input/output (I/O) peripherals on a single chip. The microcontroller may sometimes be referred to as an embedded controller or microcontroller unit (MCU).

In smart lamps, a microcontroller can be used to control functions of the lamp, such as lighting characteristics, e.g., light color, light intensity, light temperature, light dimming, light flickering and combinations thereof. The microcontroller can also be used to turn the lamps ON and OFF in response to time, and calendar date. The microcontroller can also be used to change lighting characteristics in response to commands received wirelessly, e.g., from a user interface of a desktop computer and/or a wireless device, such as a tablet, smartphone or similar type device. The microcontroller can also change lighting characteristics in response to signal received from a sensor, such as a light sensor, motion sensor or other like sensor.

Over the operation of the smart lamp, e.g., light emitting diode (LED) smart lamp, the microcontrollers may need to be rebooted, reset and/or reprogrammed. Unlike computers, e.g., laptops, desktops and tablets, and phones, e.g., smart phones, in which users can press buttons to reboot or reset the system, smart bulbs do not include a similar physical interface. Further, because smart bulbs, such as smart LED bulbs, are installed in ceiling space and/or within an enclosure of a lighting fixture, physical controls, e.g., buttons or switches, that are affixed to the smart bulbs are obstructed from being accessed by a user who may want to reset the microcontroller of the bulb. Therefore, smart bulbs can not implement conventional reset mechanisms. Instead, some models of smart bulbs, such as smart LED bulbs, are reset by switching the bulb from "ON" to "OFF" states of power via a hardware switch, e.g., light switch, in rapid succession. In this example, by removing the power for powering the light engine in a specific sequence, the microcontroller is signaled to reset its settings.

However, switching a smart LED bulb from an "ON" power state to an "OFF power state via a hardware switch, such as a light switch, is not the same as turning power off the controller, e.g., microcontroller. The methods, systems and structures that are described herein provide that the power to the controller, e.g., microcontroller, is turned off at substantially the same time as the AC power is turned off to the smart LED bulb.

Figure 2:
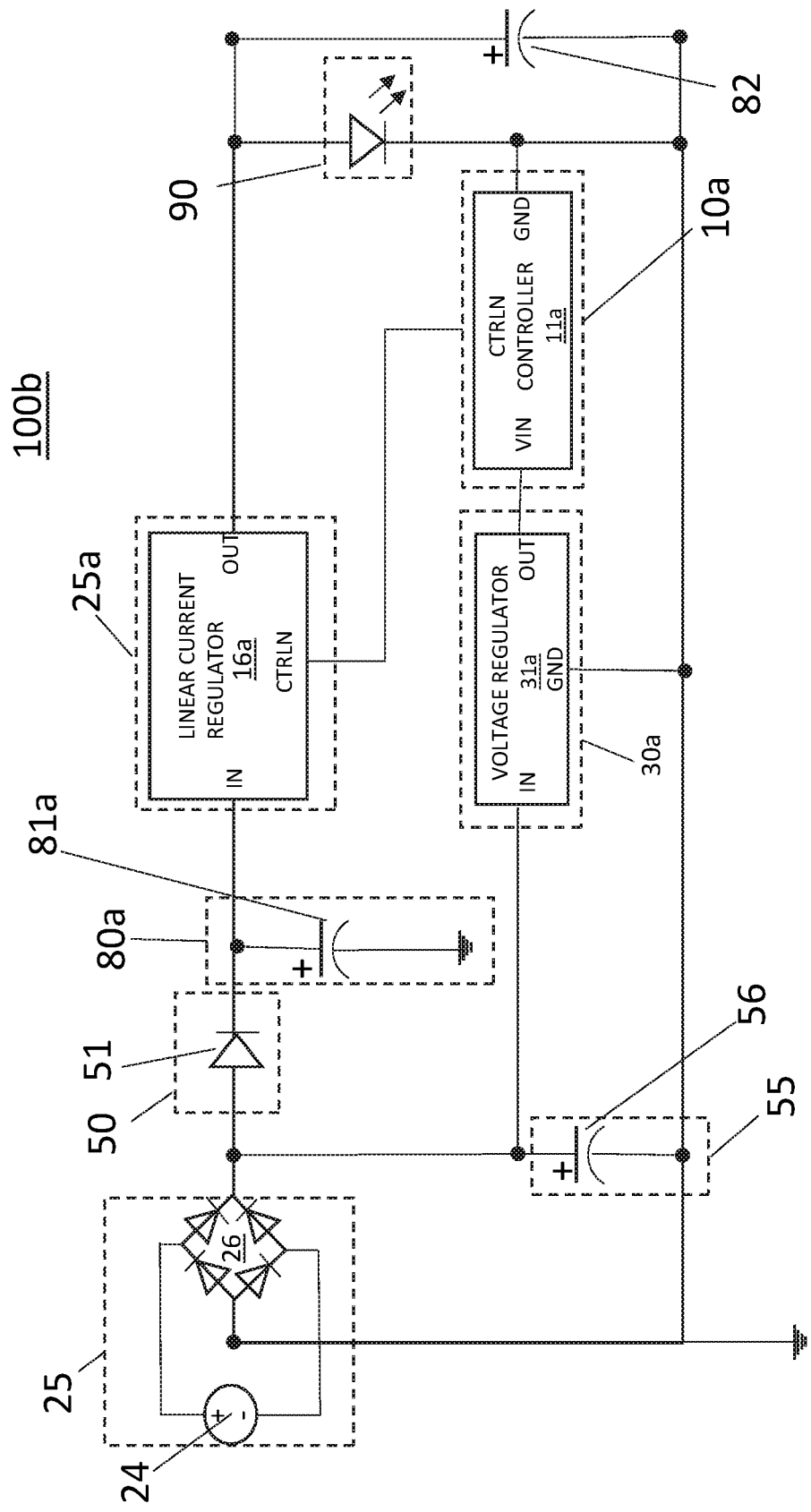
FIG. 2 is a circuit diagram of another embodiment of the reset timing circuit of the present disclosure, in which the reset timing circuit includes both an input and an output smoothing capacitor.
Figure 3:
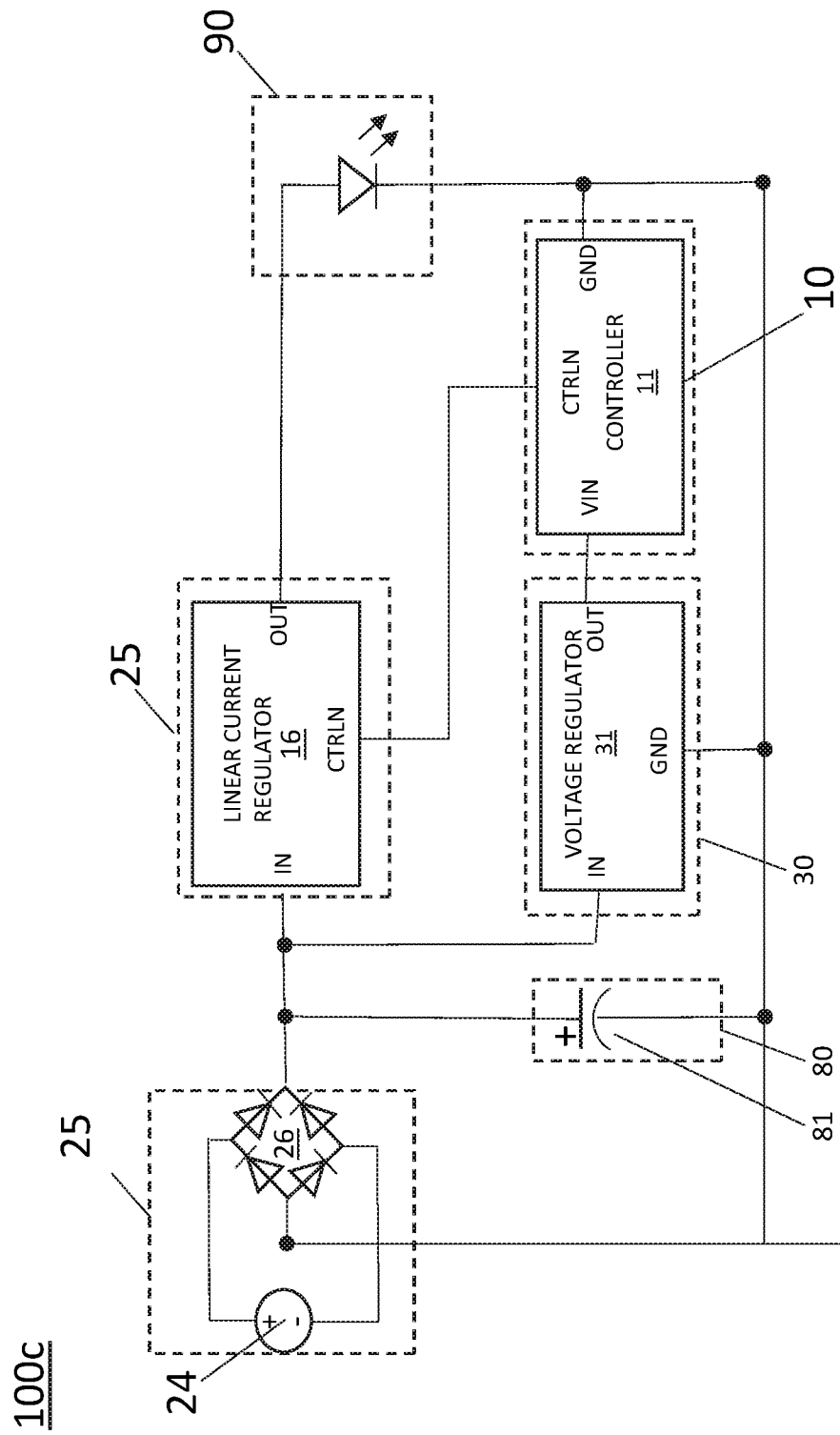
FIG. 3 is a comparative example of a reset timing circuit that does not include the diode for controlling current flow in the circuit during reset operations for the microcontroller.

Referring to FIGS. 1 and 2, in some embodiments, to provide a light emitting diode (LED) smart bulb that allows for substantially concurrent depowering of the controller circuit 10a, e.g., microcontroller 11a, with the switching of the light emitting diode (LED) smart bulb to an OFF setting, by turning off the AC power input 24 to the light emitting diode (LED) smart bulb, a reset timing circuit 100a, 100b is employed that includes a current rectifying circuit 50 that is positioned within the circuit 100a, 100b to allow only forward current through the circuit 100a, 100b, and to block backward current. In some embodiments, the current rectifying circuit 50 includes a diode 51. A "diode" is a semiconductor device with two terminals, typically allowing the flow of current in substantially one direction only. In the embodiments, by blocking backward current when the power is removed from the circuit, the current rectifying circuit 50, e.g., diode 51, prohibits residue energy from being stored in the circuit in a manner that allows for the residue energy to power the controller 11a during reset operations. For example, the diode 51 prohibits current from being stored in the input stabilizing voltage circuit 80a, e.g., the input smoothing capacitor 81a for stabilizing the input voltage. A "capacitor" is a passive two-terminal electronic component that stores electrical energy in an electric field. In some embodiments, inside the capacitor, the terminals connect to two metal plates separated by a non-conducting substance, or dielectric. In some embodiments, the methods, structures and systems of the present disclosure also provides a residual power storage circuit 55. In some embodiments, the residual power storage circuit 55 includes a residual power capacitor 56. The residual power storage circuit 55 stores the residual power that is obstructed from being stored in the stabilizing voltage circuit 80a, e.g., the input smoothing capacitor 81a for stabilizing the input voltage, by the current rectifying circuit 50, e.g., diode 51. The methods and structures of the present disclosure are now described with greater detail with reference to FIGS. 1-5. FIG. 3 illustrates a comparative linear power supply suitable for smart bulbs, such as light emitting diode (LED) smart bulbs, that can power both the output light source 90, e.g., output light emitting diodes, and the controller circuit 10, e.g., microcontroller 11. The comparative linear power supply depicted in FIG. 3 does not include the current rectifying circuit 50 and/or the residual power storage circuit 55 that is depicted in FIGS. 1 and 2.

Referring to FIG. 3, the power supply, e.g., light emitting diode (LED) power supply circuit 15, for the output light source 80, is independent from the power supply, e.g., controller power supply circuit 20, for the controller circuit 10, e.g., microcontroller 11. Still referring to FIG. 3, the comparative linear power supply also has an input stabilizing voltage circuit 80, e.g., the input smoothing capacitor 81 for stabilizing the input voltage. It has been determined that in the comparative linear power supply that is depicted in FIG. 3, when the main switch to the smart bulb, e.g., light emitting diode (LED) smart bulb, the AC power from the AC input circuit 25 is cut off from the output light source 90, e.g., output light emitting diodes (LEDs), the smart bulb may cease to emit light; however, the controller circuit 10 is still being powered. For example, in the comparative linear power supply that is depicted in FIG. 3, the input stabilizing voltage circuit 80, e.g., input smoothing capacitor 81, can hold some energy after the AC power from the AC input circuit 25 is cut off, wherein the energy stored in the input stabilizing voltage circuit 80 can be enough to power the controller circuit 10, e.g., microcontroller, for some time despite the AC power being cut off. Therefore, operations to reset a controller circuit, e.g., microcontroller 11, by turning the smart lamp from ON to OFF in succession by cutting the AC power from the AC input circuit 25 will fail in smart lamp designs employing the comparative linear power supply that is depicted in FIG. 3. For example, if the control circuit 10, e.g., microcontroller 11, is powered by a 3.3V DC power, it can be normal for the control circuit 10, e.g., microcontroller 11, to still be working until the supply voltage drops to less than 3.6V.

The circuit 100c depicted in FIG. 3 also includes an LED power supply circuit 15, and a controller power supply circuit 30. The controller power supply circuit 30 may include a voltage regulator 31. The input of the controller power supply circuit 30 is from the rectifying bridge 26 of the AC input 25. The output of the controller power supply circuit 30 is to the controller circuit 10, in which power is communicated from the power supply circuit 30 to the controller circuit 10 for the purposes of powering the controller circuit 10. The controller circuit 10, which can include a microcontroller 11, has a control output to the LED power supply circuit 15. The LED power supply circuit 15 may have an output in electrical communication with the output LED circuit 90. In this example, the microcontroller 11 can provide signals for controlling the LED power supply circuit 15. The microcontroller 11 can provide signals for controlling the power supply circuit 15 to adjust the power being supplied to the output LED circuit 15, in which the adjustment to the power to the output LED circuit 15 is in accordance with the lighting characteristics being controlled by the microcontroller 11 though a user interface. The user interface may connect to the microcontroller 11 wirelessly.

Figure 4:
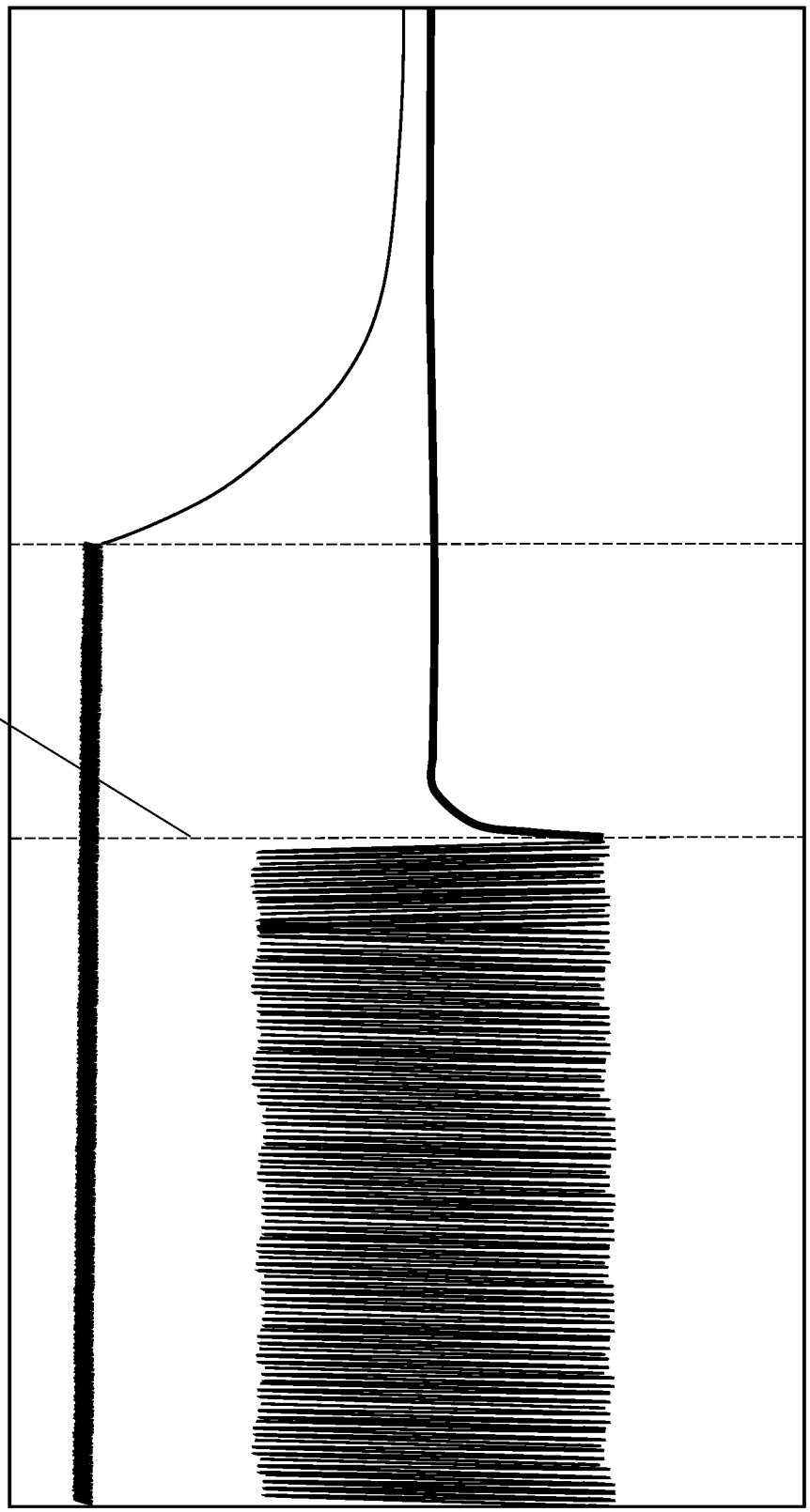
FIG. 4 is a plot of a waveform showing the time between when the time when the AC power to the light emitting diode (LED) smart bulb including the timing circuit depicted in FIG. 3 is turned off, and the time when the controller within the light emitting diode (LED) is shut down, i.e., turned off.

FIG. 4 provides an example of how the control circuit 10, e.g., microcontroller 11, can still be fed with power after the AC input 25 is turned off. FIG. 4 is a plot of a waveform showing the time between when the time when the AC power to the light emitting diode (LED) smart bulb including the timing circuit depicted in FIG. 3 is turned off, and the time when the controller within the light emitting diode (LED) is shut down, i.e., turned off. The red waveform shows that the AC input is turned off at the first line 12, but the controller circuit 10, e.g., microcontroller 11, is still on until about 980 milliseconds from the time that the AC input is turned off.

FIG. 4 illustrates that the time when the AC power is turned off does not mean that the controller circuit 10, e.g., microcontroller 11, looses power. In smart bulbs that rely upon quickly switching the bulb from ON to OFF power states via a light switch to reset the controller circuit 10, the continued supply of power to the controller circuit 10, e.g., microcontroller 11, flowing from the residual power stored in the input stabilizing voltage circuit 80, e.g., input smoothing capacitor 81, impedes the controller circuit 10, e.g., microcontroller 11, from being reset. Each round of switching from "ON to OFF" and "OFF to ON" can be done in around 500 milliseconds. For time periods of that type, the residual power can not dissipate from the system, the residual power is fed to the controller circuit 10, e.g., microcontroller 11, and the control circuit 10 can not be reset.

In some embodiments, the reset timing circuit 100a, 100b depicted in FIGS. 1 and 2 includes a current rectifying circuit 50 that is positioned within the circuit 100a, 100b to allow only forward current through the circuit 100a, 100b, and to block backward current, so that any residual power stored in the input stabilizing voltage circuit 80a, e.g., input smoothing capacitor 81a, following cutting the AC power input 25 can not flow to power the controller circuit 10a, e.g. microcontroller 11a. The reset timing circuit 100a, 100b also includes a residual power storage circuit 55, which may include a residual power capacitor 56, in which the residual power storage circuit 55 can store the residual power so that the residual power following cutting of the AC power input 25 can not power the control circuit 10a, e.g., microcontroller 11a. In some embodiments, the combination of the current rectifying circuit 50, e.g., residual current obstructing diode 51, and the residual power storage circuit 55, e.g., residual power capacitor 56, in the reset timing circuits 100a,100b depicted in FIGS. 1 and 2 reduce the time between the turn off AC power, i.e., power turn off from the AC input circuit 25, and the controller shut down, i.e., the depowering of the controller circuit 10a, e.g., microcontroller 11a, when compared to the power down characteristics of the comparative example circuit 100c depicted in FIG. 3.

The reset timing circuits 100a, 100b depicted in FIGS. 1 and 2 can reduce the time between the turn OFF AC power and controller shut down without having an impact on the design and/or performance of the other components and circuits of the reset timing circuit 100a, 100b. For example, the reset timing circuits 100a, 100b provide a way to reduce the reset time, and significantly improve the chance for a user to successfully reset a smart lamp, without sacrificing performance, such as output power, output lumen, depth of modulation, degree of flickering, etc. The implementations of the reset timing circuits 100a, 100b depicted in FIGS. 1 and 2 can be extended to any type of smart bulb driver design. The implementations of the reset timing circuits 100a, 100b can be employed in combination with any kind of power supply the driver has for the light emitting diode (LED).

The implementations of the reset timing circuits 100a, 100b can be employed with any type of control circuit 10a, e.g., microcontroller 11a. The control circuit 10a depicted in FIGS. 1 and 2 is similar to the control circuit 10 depicted in FIG. 3. For example, the microcontroller 11a depicted in FIGS. 1 and 2 can send signals to a light emitting diode (LED) power supply circuit 15a, in which in accordance with the signals, e.g., commands, provided by the microcontroller 11a the power to the LED output circuit 90 is adjusted, which can change the characteristics of the light being emitted by the light source. A "microcontroller" is an integrated circuit (IC) designed to govern a specific operation. In some embodiments, the microcontroller 11a includes a processor, memory and input/output (I/O) peripherals on a single chip. In some embodiments, adjustments to the light emitted by the lamp can be implemented with a microcontroller 11a having input/output capability (e.g., inputs for receiving user inputs; outputs for directing other components) and a number of embedded routines for carrying out the device functionality. The microcontroller 11a can be substituted with any type of controller that can control the LED power supply.

Figure 5:
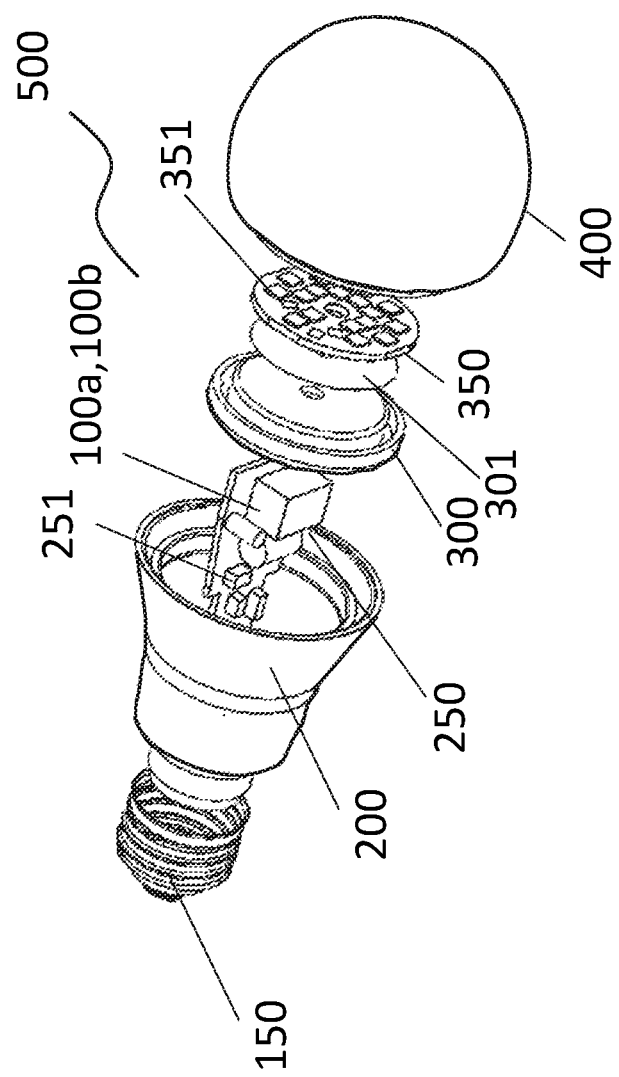
FIG. 5 is an exploded view of a lamp including a reset timing circuit as depicted in FIG. 1 or FIG. 2, in accordance with one embodiment of the present disclosure.

For example, the control circuit 10a may include memory and one or more processors, which may be integrated into the microcontroller 11a. The memory can be of any suitable type (e.g., RAM and/or ROM, or other suitable memory) and size, and in some cases may be implemented with volatile memory, non-volatile memory, or a combination thereof. A given processor of the control circuit 10a may be configured, for example, to perform operations associated with the light engine 350 (as depicted in FIG. 5) through the LED output circuit 90. In some cases, memory may be configured to store media, programs, applications, and/or content on the control circuit 10a on a temporary or permanent basis. The one or more modules stored in memory can be accessed and executed, for example, by the one or more processors of the control circuit 10a. In accordance with some embodiments, a given module of memory can be implemented in any suitable standard and/or custom/proprietary programming language, such as, for example C, C++, objective C, JavaScript, and/or any other suitable custom or proprietary instruction sets, as will be apparent in light of this disclosure. The modules of memory can be encoded, for example, on a machine-readable medium that, when executed by one or more processors, carries out the functionality of control circuit 10a, e.g., microcontroller 11a, in part or in whole. The computer-readable medium may be implemented, for instance, with gate-level logic or an application-specific integrated circuit (ASIC) or chip set or other such purpose-built logic. Some embodiments can be implemented with a microcontroller 11a having input/output capability (e.g., inputs for receiving user inputs; outputs for directing other components) and a number of embedded routines for carrying out the device functionality. The memory may include an operating system (OS). As will be appreciated in light of this disclosure, the OS may be configured, for example, to aid with the lighting controls to provide reset functions, as well as to control the characteristics of light being emitted by the light engine 350 (as depicted in FIG. 5) through the LED output circuit 90.

Referring to FIGS. 1 and 2, the microcontroller 11a can provide signals for adjustments in lighting characteristics emitted by the light engine 350 (as depicted in FIG. 5) in accordance with the lighting characteristics programmed by the user of the light source. The user may program the lamp, e.g., program the microcontroller 11a of the lamp, by a user interface, such as an interface provided by a computer, desktop computer, laptop computer, tablet computer, smart phone, mobile device etc. The user interface can be in communication wirelessly to the microcontroller 11a.

Similar to the circuit depicted in FIG. 3, the reset timing circuits 100a, 100b depicted in FIGS. 1 and 2 also includes an LED power supply circuit 15a, and a controller power supply circuit 30a. The LED power supply circuit 15a is controlled by the controller circuit 10a, e.g., microcontroller 11, and adjusts the power from the AC input circuit 25 that is passed to the output LED circuit 90, e.g., circuit to light emitting diode (LED) light source, for the purposes of adjusting the lighting characteristics of the light emitted by the lamp. The LED power supply circuit 15a may be a linear current regulator 16a. A linear regulator is a system used to maintain a steady current or voltage. For example, the resistance of the regulator varies in accordance with the load resulting in a constant output voltage. The regulating device is made to act like a variable resistor, continuously adjusting a voltage divider network to maintain a constant output voltage and continually dissipating the difference between the input and regulated voltages as waste heat. Linear regulators may place the regulating device in parallel with the load (shunt regulator) or may place the regulating device between the source and the regulated load (a series regulator). Simple linear regulators may only contain a Zener diode and a series resistor; more complicated regulators include separate stages of voltage reference, error amplifier and power pass element.

In one example, the linear current regulator 16 may be a dual channel Pulse Width Modulation (PWM)/analog dimmable linear constant current light emitting diode (LED) driver. The dual channel Pulse Width Modulation (PWM)/analog dimmable linear constant current light emitting diode (LED) driver may include a 120 mA/500V metal oxide semiconductor (MOS) device. The dual channel Pulse Width Modulation (PWM)/analog dimmable linear constant current light emitting diode (LED) driver may support up to 10 kHz PWM frequency. The dual channel Pulse Width Modulation (PWM)/analog dimmable linear constant current light emitting diode (LED) driver may be available in an ESOP-8 package.

The controller power supply circuit 30a depicted in FIGS. 1 and 2 is similar to the controller power supply circuit 30 depicted in FIG. 3. The input of the controller power supply circuit 30a is from the rectifying bridge 26 of the AC input 25. The output of the controller power supply circuit 30a is to the controller circuit 10a, in which that power that is communicated from the power supply circuit 30a to the controller circuit 10a is for the purposes of powering the controller circuit 10a. The controller circuit 10a, which can include a microcontroller 11a, has a control output to the LED power supply circuit 15a. The power supply circuit 15a may have an output in electrical communication with the output LED circuit 90. In this example, the microcontroller 11a can provide signals for controlling the power supply circuit 15a. The microcontroller 11a can provide signals for controlling the power supply circuit 15a to adjust the power being supplied to the output LED circuit 15a, in which the adjustment to the power to the output LED circuit 15a is in accordance with the lighting characteristics being controlled by the microcontroller 11a.

The controller power supply circuit 30a depicted in FIGS. 1 and 2 may include a voltage regulator 31a. A voltage regulator is a system designed to maintain a constant voltage level. A voltage regulator may use a simple feed-forward design or may include negative feedback. It may use an electromechanical mechanism, or electronic components. In some embodiments, the voltage regulator 31a may be a non-isolated buck switch for constant output voltage applications, in which the output voltage can be adjusted. The programmable output voltage of the non-isolated buck switch may support 3.0V to 3.5V without LDO. The LDO is the low-drop-out regulator. The non-isolated buck switch may integrate a 700V power metal oxide semiconductor field effect transistor (MOSFET). The non-isolated buck switch may be available in an SOP-8 package. It is noted that the example provided above for the voltage regulator 31a is provided for illustrative purposes only. In some embodiments, the power supply, e.g., voltage regulator 31a for the controller power supply circuit 30a, can be a liner power supply or switch mode power supply.

Referring to FIGS. 1 and 2, the methods and structures of the present disclosure position a current rectifying circuit 50, e.g., residual current obstructing diode 51, behind the bridge 26 of the AC input circuit 25. In some embodiments, the bridge of the AC input circuit 25 is a diode bridge rectifier 26 connected to the AC power input 24. Diodes D1, D2, D3, D4 can be connected together to form a full wave rectifier that convert AC voltage into DC voltage for use in power supplies. The diode bridge rectifier 26 may include four diodes D1, D2, D3, D4 that are arranged in series pairs with only two diodes conducting current during each half cycle. During the positive half cycle of the supply, diodes D1 and D2 conduct in series while diodes D3 and D4 are reverse biased and the current flows through the load. During the negative half cycle of the supply, diodes D3 and D4 conduct in series, but diodes D1 and D2 switch "OFF" as they are now reverse biased. It is noted that the power source does not necessarily have to be an AC power source. For example, the power source for the reset timing circuits 100a, 100b may be a DC power source with minor adjustments such as removing the rectifying components.

The current rectifying circuit 50, e.g., residual current obstructing diode 51, is positioned between the bridge of the AC input circuit 25, and an input stabilizing voltage circuit 80a, which can include an input stabilizing capacitor 81a. The input stabilizing capacitor 81a may also be referred to as smoothing capacitor. The input stabilizing capacitor 81a may be employed to improve the average DC output of the rectifier, e.g., rectifying bridge 26, while at the same time reducing the AC variation of the rectified output by employing the input stabilizing capacitor 81a to filter the output waveform. The input stabilizing capacitor 81a may be an electrolytic capacitor (e-cap). An e-cap is a polarized capacitor whose anode or positive plate is made of a metal that forms an insulating oxide layer through anodization. This oxide layer acts as the dielectric of the capacitor. A solid, liquid, or gel electrolyte covers the surface of this oxide layer, serving as the (cathode) or negative plate of the capacitor. Due to their very thin dielectric oxide layer and enlarged anode surface, electrolytic capacitors have a higher capacitance-voltage (CV) product per unit volume than ceramic capacitors or film capacitors, and so can have large capacitance values. The electrolytic capacitor for the input stabilizing capacitor 81a may be provided by at least one of an aluminum electrolytic capacitor, a tantalum electrolytic capacitor, a niobium electrolytic capacitor, and combinations thereof. In one example, the input stabilizing capacitor 81a of the input stabilizing voltage circuit 80a has a value ranging from 0.5 µF to 250 µF. In another example, the input stabilizing capacitor 81a of the input stabilizing voltage circuit 80a has a value ranging from 1 µF to 200 µF.

It is noted that the input stabilizing capacitor 81a is not limited to only the aforementioned examples. For example, in addition to the input stabilizing capacitor 81a being provided by an electrolytic capacitor (e-cap), in some examples, the input stabilizing capacitor 81a may also be provided by a ceramic capacitor and/or film capacitor.

The input stabilizing capacitor 81a of the input stabilizing voltage circuit 80a of the reset timing circuit 100a 100b that is depicted in FIGS. 1 and 2 is similar to the input stabilizing circuit 80, e.g., input stabilizing capacitor 81, of the reset timing circuit 100c depicted in FIG. 3. As described above, with reference to FIG. 3, the input stabilizing circuit 80, e.g., input stabilizing capacitor 81, can be the source of stored power, i.e., residual energy, which in the design depicted in FIG. 3 can flow backward to the control circuit 10, e.g., microcontroller 11, continuing to power the control circuit 10 after turning the AC power from the AC input circuit 25 off.

The current rectifying circuit 50, which may include a residual current obstructing diode 51, that is positioned between the input stabilizing circuit 80, e.g., input stabilizing capacitor 81, and the AC input circuit 25, can allow forward current that can flow through the diode into the system, but blocks backwards current. In the reset timing circuit 100a 100b that is depicted in FIGS. 1 and 2, when the AC input flows into the circuit, forward current is allowed to flow through the current rectifying circuit 50, e.g., residual current obstructing diode 51, to power the light engine 350 (as depicted in FIG. 5). For example, current flows into the light emitting diode (LED) power supply circuit 15 for powering the light emitting diode (LED) output circuit 90, and the controller power supply circuit 30a for powering the controller circuit 10a. A lamp employing the reset timing circuit 100a, 100b depicted in FIGS. 1 and 2 can power the lamp under normal operation when the power is forward biased through the current rectifying circuit 50, e.g., residual current obstructing diode 51. However, when the AC input flow from the AC input circuit 25 is turned OFF, any residual energy that can be stored in the input stabilizing circuit 80a, e.g., input stabilizing capacitor 81a, is prohibited by the current rectifying circuit 50, e.g., residual current obstructing diode 51, from flowing backward to the controller power supply circuit 30. This distinguishes the reset timing circuits 100a, 100b that are depicted in FIGS. 1 and 2 for the circuit 100c that is depicted in FIG. 3.

As indicated above, the reset timing circuit 100c depicted in FIG. 3 does not include the current rectifying circuit 50, e.g., residual current obstructing diode 51. Therefore, in the reset timing circuit 100c depicted in FIG. 3, current backflow from the input stabilizing circuit is not prohibited, and current backflow from the input stabilizing circuit 80 powers the controller power supply circuit 30. In the reset timing circuits 100a, 100b depicted in FIGS. 1 and 2, the current rectifying circuit 50, e.g., residual current obstructing diode 51, prohibits current backflow from the input stabilizing circuit 80a, e.g., input stabilizing capacitor 81a, from traveling to the controller power supply circuit 30a. Therefore, the current rectifying circuit 50, e.g., residual current obstructing diode 51, of the reset timing circuits 100a, 100b ensures that the controller power supply circuit 30a can not be supported by residual power being stored in the input stabilizing circuit 80a, e.g., input stabilizing capacitor 81a, following the AC power input being cut. In the reset circuits 100a, 100b designs depicted in FIGS. 1 and 2, the delay time between the AC turn-off and controller shut down can be very short, so that the reset process for the control circuit 10, e.g., microcontroller 11, can be effective and consistent.

The current rectifying circuit 50, e.g., residual current obstructing diode 51, may be a semiconductor diode. In some embodiments, a semiconductor diode is a crystalline piece of semiconductor material with a p-n junction connected to two electrical terminals. The semiconductor diode may be composed of silicon, however other types of type IV semiconductors may also be used, such as germanium. The semiconductor diode can also be composed of a type III-V semiconductor material, such as gallium arsenide. The residual current obstructing diode 51 may be a surface mount type device. For example, the residual current obstructing diode 51 can be of a small outline design package. Small Outline Diode (SOD) is a designation for a group of semiconductor packages for surface mounted diodes. The standard includes multiple variants such as SOD-123, SOD-323, SOD-523 and SOD-923. Each of the above SOD standards are suitable for use with the residual current obstructing diode 51.

In some embodiments, the residual current obstructing diode 51 has a maximum continuous forward current ranges from 150 mA to 250 mA. In some embodiments, the peak reverse repetitive voltage of the residual current obstructing diode 51 may range from 150 V to 250 V.

In some embodiments, the residual current obstructing diode 51 has a maximum forward voltage drop ranging from 875 mV to 950 mV. In some embodiments, the residual current obstructing diode 51 has a peak reverse recovery time ranging from 40 ns (nanoseconds) to 60 ns (nanoseconds). In some embodiments, the residual current obstructing diode 51 has peak reverse current ranging from 75 nA to 125 nA. In some embodiments, the maximum operating temperature for the residual current obstructing diode 51 may range from 130° C. to 170° C. In one example, the residual current obstructing diode 51 has a maximum continuous forward current of 200 mA, a peak reverse repetitive voltage of 200 V, a maximum forward voltage drop of 925 mV, a peak reverse recovery time of 50 ns, a peak reverse current of 100 nA, and a maximum operating temperature of 150° C. In one example, the residual current obstructing diode 51 is a 200V 200 mA rectifying diode. It is noted that the present disclosure is not limited to only this example. For example, the residual current obstructing diode 51 may be any type of diode, such as a Schottky diode, power diode, Zener diode, or any kind of like diode.

Referring back to FIGS. 1 and 2, in some embodiments, with the addition of the current rectifying circuit 50, e.g., residual current obstructing diode 51, another input capacitor 56 is also added to the circuit, in which the input capacitor 56 stores residual power in the circuit following the AC power to the circuit being turned off. The additional input capacitor 56 that is added to the circuit may be referred to as a residual power storing capacitor 56. In some embodiments, the residual power storing capacitor 56 is a component of a residual power storing circuit 55. The residual power storing circuit 55, e.g., residual power storing capacitor 56, is present between the current rectifying circuit 50, e.g., residual current obstructing diode 51, and the controller power supply circuit 30, e.g., voltage regulator 31. In some embodiments, the residual power storing capacitor 56 has a lesser capacitance than the input stabilizing capacitor 81a of the input stabilizing voltage circuit 80a. For example, the residual power storing capacitor 56 can have a value ranging from 0.075 µF to 150 µF. In another example, the residual power storing capacitor 56 can have a value ranging from 0.1 µF to 100 µF. In some embodiments, the residual power storing capacitor 56 may be provided by an electrolytic capacitor (e-cap), such as an aluminum electrolytic capacitor, a tantalum electrolytic capacitor, a niobium electrolytic capacitor, and combinations thereof. It is noted that the residual power storing capacitor 56 is not limited to only the aforementioned examples. For example, in addition to the residual power storing capacitor 56 being provided by an electrolytic capacitor (e-cap), in some examples, the residual power storing capacitor 56 may also be provided by a ceramic capacitor and/or film capacitor. In some embodiments, the residual power storing capacitor 56 is connected in parallel to the AC input circuit 25.

In some embodiments, in the reset timing circuits 100a, 100b that are depicted in FIGS. 1 and 2, when the AC power is turned off, the controller circuit 10, e.g., microcontroller 11, can only be supported by the residual power that is being stored in the residual power storing capacitor 56. The small capacitance of the residual power storing capacitor 56, the delay time between the AC turn-off, and the controller shut down can be very short, so that the recess process of the microcontroller 11 can be effective and predictable. The maximum capacitance value of the residual power storing capacitor 56 can have a maximum capacitance of 150 µF. In some examples, the maximum capacitance value of the residual power storing capacitor 56 can have a maximum capacitance of 1 mF. In some examples, the delay time between the AC turn-off, and the controller shut down, can range from 1 millisecond to 5 seconds.

FIG. 1 is a circuit diagram of a reset timing circuit 100a for a linear power supply for light emitting diode (LED) smart bulbs including a microcontroller 11, in which a diode 51 is positioned within the circuit to allow forward current and to block backward current, wherein by blocking current when the power is removed from the circuit, the diode 51 prohibits residue energy from being stored in the circuit in a manner that allows for the residue energy to power the microcontroller 11 during reset operations. The circuit 100a depicted in FIG. 1 includes a residual power storage circuit 55 that may include a residual power capacitor 56, and an input stabilizing voltage circuit 80a, which may include an input smoothing capacitor 81a. FIG. 2 is a circuit diagram 100b of another embodiment of the reset timing circuit 100b, in which the reset timing circuit 100b includes both an input smoothing capacitor 81a and an output smoothing capacitor 82. With the exception of the output smoothing capacitor 82, the reset timing circuit 100b depicted in FIG. 2 is similar to the reset timing circuit 100a that is depicted in FIG. 1. Therefore, the description of the elements having reference numbers depicted in FIG. 1 is suitable for the description of the elements of the circuit diagram having the same reference numbers in FIG. 2. The output smoothing capacitor 82 depicted in FIG. 2 may be provided by at least one of an aluminum electrolytic capacitor, a tantalum electrolytic capacitor, a niobium electrolytic capacitor, and combinations thereof. In one example, the output capacitor 82 has a value ranging from 0.5 µF to 250 µF. In another example, the output smoothing capacitor 82 has a value ranging from 1 µF to 200 µF.

The reset timing circuit 100a, 100b may be integrated into the driver electronics 250 (also referred to as driver package) of a lamp 500 employing a light engine 350 including a solid state light source, such as light emitting diodes (LEDs), as depicted FIG. 5. For example, the driver electronics 250, e.g., lighting circuit, is a circuit for causing the light emitting diodes (LEDs) of the light engine 350 to emit light and is housed in the base housing 200. More specifically, the driver electronics 250, e.g., lighting circuit, includes a plurality of circuit elements, and a circuit board on which each of the circuit elements is mounted. In this embodiment, the driver electronics 250, e.g., lighting circuit, converts the AC power received from the base 150 of the base housing 200 to the DC power, and supplies the DC power to the LEDs of the light engine 350. The reset timing circuit 100a, 100b may be at least one component of the driver electronics 250.

Referring to FIG. 5, the driver electronics 250 may include a communications module 251 for providing wireless communication from a user interface for receipt of programmed light characteristic settings received from the user. The communication module 251 may be configured for wired (e.g., Universal Serial Bus or USB, Ethernet, Fire-Wire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In some embodiments, the communication module 251 may be configured for communication by cellular signal used in cellular phones, and cellular type devices. In some embodiments, communication module 251 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 251, as desired for a given target application or end-use.

The driver electronics 250 including the reset timing circuit 100a, 100b may be housed within a base housing 200 that is composed of a resin material. The base housing 200 can be provided at the opening of the globe 400. More specifically, the base housing 200 is attached to the globe 400 using an adhesive such as cement to cover the opening of the globe 400. The base 150 is connected to the end of the base housing 200 that is opposite the end of the base housing 200 that is closest to the globe 400. In the embodiment that is depicted in FIG. 5, the base 150 is an E26 base. The light bulb shaped lamp 500 can be attached to a socket for E26 base connected to the commercial AC power source for use. Note that, the base 150 does not have to be an E26 base, and maybe a base of other size, such as E17. In addition, the base 150 does not have to be a screw base and may be a base in a different shape such as a plug-in base.

Referring to FIG. 5, the lamp 500 employs light engine 350 including solid state light emitters, e.g., light emitting diodes (LEDs) 351, to provide the light illumination. The term "solid state" refers to light emitted by solid-state electroluminescence, as opposed to incandescent bulbs (which use thermal radiation) or fluorescent tubes. Compared to incandescent lighting, solid state lighting creates visible light with reduced heat generation and less energy dissipation. Some examples of solid state light emitters that are suitable for the methods and structures described herein include semiconductor light-emitting diodes (LEDs), organic light-emitting diodes (OLED), polymer light-emitting diodes (PLED) or combinations thereof. Although the following description describes an embodiment in which the solid state light emitters are provided by light emitting diodes, any of the aforementioned solid state light emitters may be substituted for the LEDs.

In the embodiment depicted in FIG. 5, the light source for the light engine is provided by light emitting diodes (LEDs) 351. In a broad sense, a light emitting diode (LED) 351 is a semiconductor device that emits visible light when an electric current passes through it. Some examples of solid state light emitters that are suitable for the methods and structures described herein include inorganic semiconductor light-emitting diodes (LEDs), organic semiconductor light-emitting diodes (OLEDs), surface mount light emitting diodes (SMT LEDs), polymer light-emitting diodes (PLED), filament type light-emitting diodes (LEDs) or combinations thereof. The LEDs 351 can be mounted to a panel, also referred to as a substrate, in which the LEDs may include several surface mount device (SMD) light emitting diodes (LEDs). In one example, a LED bulb, as depicted in FIG. 5, can contain a single LED 351 to arrays of 5 to 10 LEDs 351. The light engine 350 may include light emitting diodes (LEDs) 351 engaged to a circuit board including substrate. The LEDs 351 can be mounted to the circuit board by solder, a snap-fit connection, or other engagement mechanisms. In some examples, the LEDs 351 are provided by a plurality of surface mount discharge (SMD) light emitting diodes (LED). The circuit board may be a printed circuit board (PCB) the mechanically supports and electrically connects electronic components, such as the LEDs 351, using conductive tracks, pads and other features etched from copper sheets laminated onto a non-conductive substrate. The printed circuit board is typically composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinylester, or polyester thermosetting plastic, though phenol formaldehyde resins are still in use. In some embodiments, the printed circuit board (PCB) is composed of a composite consistent with the above description that is called FR-4. The printed circuit board may be made in one piece or in longitudinal sections joined by electrical bridge connectors. In some cases, circuit board may further include other componentry, such as, for example, resistors, transistors, capacitors, integrated circuits (ICs), and power and control connections for a given LED, i.e., solid state light emitter, to name a few examples.

In some embodiments, the light engine 350 may include LEDs that are part of an LED filament structure. The LED filament structure may include a substrate and a plurality of series connected light emitting diodes (LEDs) that are present on the substrate that extending from a cathode contact portion of the LED filaments structure to an anode contact portion of the LED filament structure. The series connected light emitting diodes (LEDs) of the LED filament structure can be covered with a phosphorus coating. In some embodiments, each of the light emitting diode (LED) filament structures includes LED's arranged in rows on small strips. In one example, the number of LEDs arranged on the substrate of the light emitting diode (LED) filaments structure can range from 10 LEDs to 50 LEDs. In some embodiments, the LED filament structure is composed of a metal strip with series of LEDs aligned along it. A transparent substrate, usually made from glass, e.g., silicon (Si) and/or silicon oxide ($SiO_2$), or sapphire, e.g., aluminum oxide ($Al_2O_3$), materials are used to cover the LED's. This transparency allows the emitted light to disperse evenly and uniformly without any interference or light loss. The LEDs may be referred to as chip on board (COB) and/or chip on glass (COG). In one example, the LED's on the filament strip emit a blue colored light. For example, the blue light emitted by the LEDs on the filament strip of the LED filaments may have wavelengths ranging from approximately 490 nm to 450 nm. To provide "white light" a coating of phosphor in a silicone resin binder material is placed over the LEDs and glass to convert the blue light generated by the LEDs of the LED filament structure. White light is not a color, but a combination of all colors, hence white light contains all wavelengths from about 390 nm to 700 nm. Different phosphor colors can be used to change the color of the light being emitted by the LEDs. For example, the more yellow the phosphor, the more yellow and warm the light becomes. Each of the light emitting diode (LED) filament structures may have a length on the order of 4" and a width on the order of ⅛". In some embodiments, the light source 350 can emit white light having a color temperature ranging from 2700K to 6500K. In one example, the white light emitted by the LEDs 351 may be referred to a "day white" with a temperature ranging from 3800K to 4200K. In another example, the white light emitted by the light emitting diode (LED) filament structures 50a, 50b may have a warm white light with a temperature ranging from around 2600K to 3000K. It is noted that the above examples are provided for illustrative purposes only and are not intended to limit the present disclosure.

The LEDs 351 of the light engine 350 of the lamp 500 may be selected or adjusted by the control circuit 10a to emit a specific color. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. The LEDs 351 of the light engine 350 of the lamp 500 may be selected or adjusted by the control circuit 10a to emit a specific color temperature. The "color temperature" of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs of the lamp 500 provided herein may emit light having the aforementioned examples of color temperatures. In some examples, the LEDs 351 of the light engine 350 of the lamp 500 are capable of adjusting the "color temperature" of the light they emit.

The LEDs 351 of the light engine 350 of the lamp 500 may be selected or adjusted by the control circuit 10a to emit a specific light intensity. In some examples, dimming or light intensity may be measured using lux. In some embodiments, the LEDs of the light engine 75 can provide lighting having an intensity between 100 lux to 1000 lux. For example, lighting 350 office work may be comfortably done at a value between 250 lux to 500 lux. For greater intensity applications, such as work areas that involve drawing or other detail work, the intensity of the lamps can be illuminated to a range within 750 lux to 1,000 lux. In some embodiments, the LEDs of the light engine 350 of the lamp 500 are capable being adjusted to adjust the light intensity/dimming of the light they emit.

The light engine 350 is positioned underlying the globe 400 of the lamp 500. In some embodiments, the globe 400 is a hollow translucent component, houses the light engine 350 inside, and transmits the light from the light engine 350 to outside of the lamp 500. In some embodiments, the globe 400 is a hollow glass bulb made of silica glass transparent to visible light. The globe 400 can have a shape with one end closed in a spherical shape, and the other end having an opening. In some embodiments, the shape of the globe 400 is that a part of hollow sphere is narrowed down while extending away from the center of the sphere, and the opening is formed at a part away from the center of the sphere. In the embodiment that is depicted in FIG. 5, the shape of the globe 400 is Type A (JIS C7710) which is the same as a common incandescent light bulb. It is noted that this geometry is provided for illustrative purposes only and is not intended to limit the present disclosure. For example, the shape of the globe 400 may also be Type G, Type BR, or others. The portion of the globe 400 opposite the opening may be referred to as the "dome portion of the optic".

Referring to FIG. 5, the lamp 500 can optionally include a heatsink portion 300 configured to be in thermal communication with light engine 350 to facilitate heat dissipation for the lamp 500. To that end, optional heatsink portion 300 may be of monolithic or polylithic construction and formed, in part or in whole, from any suitable thermally conductive material. For instance, optional heatsink portion 300 may be formed from any one, or combination, of aluminum (Al), copper (Cu), gold (Au), brass, steel, or a composite or polymer (e.g., ceramics, plastics, and so forth) doped with thermally conductive material(s). The geometry and dimensions of optional heatsink portion 300 may be customized, as desired for a given target application or end-use. In some instances, a thermal interfacing layer 301 (e.g., a thermally conductive tape or other medium) optionally may be disposed between heatsink portion 300 and light engine 350 to facilitate thermal communication there between. Other suitable configurations for optional heatsink portion 300 and optional thermal interfacing layer 301 will depend on a given application.

It is noted that the structure and lamp systems of the present disclosure are not limited to only the form factor for the lamp 500 that is depicted in FIG. 5. As will be appreciated in light of this disclosure, the lamp as variously described herein may also be configured to have a form factor that is compatible with power sockets/enclosures typically used in existing luminaire structures. For example, some embodiments may be of a PAR20, PAR30, PAR38, or other parabolic aluminized reflector (PAR) configuration. Some embodiments may be of a BR30, BR40, or other bulged reflector (BR) configuration. Some embodiments may be of an A19, A21, or other A-line configuration. Some embodiments may be of a T5, T8, or other tube configuration.

In another aspect, a method is provided for the reset functions for a microcontroller 10a, used control the light adjustment settings in a lamp 500, e.g., smart lamp, such as a light emitting diode (LED) smart lamp. In one embodiment, the method for resetting a controller, e.g., microcontroller 10a, of a lighting device includes positioning a microcontroller 10a in a driver package 250 for powering a light engine 350 of a lamp, in which the driver package 250 includes an input smoothing capacitor 81a between an interface to an AC power source 25 and a linear current regulator 16 to the light engine 350. The instructions of the microcontroller 10a for adjusting light emitted by the light engine 350 are reset by toggling the AC power source ON and OFF. The method further includes positioning a rectifying current circuit 50 between the input smoothing capacitor 81a and the microcontroller 11a. The rectifying current circuit 50 allows forward current to travel from the AC power source through the linear current regulator 16 to power the light engine 350 when the AC power is ON. The rectifying current circuit 50 obstructs back current from the input smoothing capacitor 81a to the microcontroller 11a when the AC power source is OFF. For the method of resetting the microcontroller 11a, the entirety of the reset timing circuit 100a, 100b that is described above with reference to FIGS. 1 and 2 may be integrated into the driver package 250. The method further includes resetting the microcontroller 11a by toggling the AC power source ON and OFF, wherein the back current from the input smoothing capacitor 81a is obstructed by the rectifying current circuit 50 from powering the microcontroller 11a during resetting of the microcontroller 11a. It is noted that the reset/reprogram process for the microcontroller 11a can be any pattern of switch ON-OFF operations. For example, the number of toggles in a set time period, e.g., time interval, for the ON-OFF switch operation that would reset the microcontroller may be any number of toggles, for any time period, and in any pattern. All that is required is that the pattern, time and number of toggles be associated with a reset/reprogram action recognized by the microcontroller 11a. It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of a DESIGN TO IMPROVE RELIABILITY OF HARDWARE RESET PROCESS FOR SMART LIGHT EMITTING DIODE (LED) BULBS, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A driver circuit comprising for lighting comprising:
   a power supply circuit for powering a light engine using power received from an power input circuit, the power supply circuit includes a smoothing capacitor;
   a controller for signaling the power supply circuit to control current to the light engine; and
   a controller reset circuit for resetting the controller, wherein the controller reset circuit resets the controller by removing power to the controller, the controller reset circuit including an electrical passage including a two terminal semiconductor device that restricts current flow in a single direction that is in direct contact with the smoothing capacitor, the two terminal semiconductor device is between the smoothing capacitor and the controller and restricts said current flow to said single direction so that back current from the smoothing capacitor can not power the controller.

2. The driver circuit of claim 1, wherein the electrical passage between the smoothing capacitor and the controller that restricts the current flow to the single direction is a diode.

3. The driver circuit of claim 2, wherein the diode is selected from the group consisting of a power diode, schottky diode, zener diode and combinations thereof.

4. The driver circuit of claim 2, wherein the diode by restricting said current flow is prohibiting back current from providing residual power to powering the controller once the power is turned off by the controller reset circuit.

5. The driver circuit of claim 1, wherein the light engine includes at least one light emitting diode (LED).

6. The driver circuit of claim 1, wherein the controller is a microcontroller.

7. The driver circuit of claim 6, wherein the controller adjusts dimming performance of the light engine.

8. The driver circuit of claim 1 further comprising a residual capacitor positioned between the smoothing circuit and the controller circuit.

9. The driver circuit of claim 8, wherein the capacitance of the smoothing capacitor is greater than the capacitance of the residual capacitor.

10. The driver circuit of claim 1, wherein the smoothing capacitor may be an input capacitor or an output capacitor or a combination thereof.

11. The driver circuit of claim 1, wherein the power input circuit converts AC current into DC current.

12. A lamp comprising:
a light engine including light emitting diodes (LEDs) for providing light; and
a driver package including a power supply circuit that includes a smoothing capacitor; a controller for signaling the power supply circuit to control current to the light engine; and a controller reset circuit for resetting the controller, wherein the controller reset circuit resets the controller by removing power to the controller, the controller reset circuit including an electrical passage including a two terminal semiconductor device that restricts current flow in a single direction that is in direct contact with the smoothing capacitor, the two terminal semiconductor device is between the smoothing capacitor and the controller and restricts said current flow to said single direction so that back current from the smoothing capacitor can not power the controller.

13. The lamp of claim 12, wherein the electrical passage between the smoothing capacitor and the controller that restricts the current flow to the single direction is a diode.

14. The lamp of claim 13, wherein the diode is selected from the group consisting of a power diode, schottky diode, zener diode and combinations thereof.

15. The lamp of claim 13, wherein the diode by restricting said current flow is prohibiting back current from providing residual power to powering the controller once the power is turned off by the controller reset circuit.

16. The lamp of claim 12, wherein the light engine includes at least one light emitting diode (LED).

17. The lamp of claim 12, wherein the controller is a microcontroller.

18. The lamp of claim 17, wherein the controller adjusts dimming performance of the light engine.

19. A method of resetting a controller of a lighting device comprising:
positioning a controller in a driver package for powering a light engine of a lamp, the driver package includes a smoothing capacitor, wherein instructions of the controller for adjusting light emitted by the light engine are reset by toggling a power source ON and OFF;
positioning a rectifying current circuit in direct contact with the smoothing capacitor, and between the smoothing capacitor and the microcontroller, the rectifying current circuit allowing forward current to power the light engine when the power source is ON, the rectifying current circuit obstructing back current from the smoothing capacitor to the microcontroller when the power source is OFF; and
resetting the controller by said toggling the power source ON and OFF, wherein the back current from the smoothing capacitor is obstructed by the rectifying current circuit from powering the microcontroller during said resetting of the microcontroller.

20. The method of claim 19, wherein the light engine includes at least one light emitting diode (LED).

* * * * *